UNITED STATES PATENT OFFICE 2,198,065

PROCESS FOR PURIFYING WOOD PULP

Lyle Melvin Sheldon, East Alton, and Lionel Elmer Goff, Alton, Ill., assignors to The Cellulose Research Corporation, East Alton, Ill., a corporation of Delaware No Drawing. Application November 27, 1936, Serial No. 112,986

2 Claims. (Cl. 92—13)

This invention relates to the production of wood cellulose suitable for esterification purposes, and more particularly for conversion into cellulose acetate.

A primary object of the invention is to provide a step in the process of purifying wood celluloses whereby an optimum swollen condition and a high degree of purity and reactivity are imparted to the cellulose fibers to render them uniformly and readily responsive to treating reagents and suitable for esterification purposes.

Another object is to provide a step in the process of purifying wood cellulose to render it suitable for esterification, and more particularly acetylation, whereby its alpha cellulose content is raised to above 98%.

A still further object of the invention is to provide a step in the purification of wood cellulose suitable for esterification, and particularly for acetylation, whereby the swelling and porosity of the cellulose fibers are increased to such an extent that substantially complete accessibility of treating solutions to all parts of the individual fibers is attained.

Still another object is to provide a step in the process of purifying wood cellulose to a quality suitable for conversion into cellulose acetate whereby residual color and haze producing material in the cellulose is reduced to such an extent that the acetone solutions of acetate derived from the purified cellulose will have less than 100 parts per million color and haze.

Other objects will be obvious.

In the preparation of cellulose for use in the manufacture of cellulose esters and ethers, particularly cellulose acetate, a primary requirement is a high degree of reactivity and purity of the base cellulose material. Unless the product is highly reactive to treating reagents, conversion to the desired derivative does not occur uniformly or completely. In the case, for example, of acetate, the percentage of partly acetylated or even entirely unacetylated particles and fibers may be so high that the product is of no commercial value.

Another important consideration is that the cellulose be substantially free of impurities which cause color and haze in solutions of the acetate in appropriate solvents. Where the derivative acetate product is to be used in the manufacture of film and other articles of commerce demanding high clarity, the color and haze in acetic acid or acetone solutions of the acetate are generally required to meet the test of not exceeding 100 parts per million.

We have discovered that when wood cellulose has been brought to the requisite degree of purity, a treatment in a sodium hydroxide solution under specially controlled mercerizing conditions not only imparts a high degree of reactivity to the cellulose but also improves its purity. At the same time this treatment substantially removes any residual color and haze producing material which may have survived the previous refinement.

Upon the completion of this treatment, the fibers are in a highly favorable condition for subsequent treatment. It is of the utmost importance to maintain them in this state. We accomplish this by removing the alkaline solution, concomitantly saturating the fibers with water in such a manner as to preserve the highly swollen, porous condition imparted to them by the mercerizing treatment.

The present invention therefore consists in providing a step in the process of purifying wood cellulose which comprises increasing the porosity and reactivity of the individual fibers by rendering them highly swollen. Concomitantly the soda solubility is lowered and the alpha cellulose content increased. At the same time substantially all of the residual impurities which tend to produce color and haze in acetate solutions are removed. The highly swollen, porous condition and reactivity of the individual fibers are preserved by maintaining them saturated with a liquid.

In carrying out the process, delignified sulfite wood pulp is treated in a sodium hydroxide solution of 13% to 15% concentration at a temperature in the range of 25° to 30° C., preferably at about 30° C. The time of treatment may vary from ¼ to 4 hours or more.

It has been found that treatment of the purified cellulose with a caustic soda solution of a concentration of the order of 14% results in a maximum purity of cellulose as measured by the alpha cellulose content and soda solubility of the material. It has likewise been found that the color and haze of the cellulose acetate solutions are at a minimum when the cellulose used in their preparation is mercerized at 25° to 30° C., and preferably at 30° C.

The effect on the cellulose of the mercerization treatment is governed by the concentration of the caustic reagent in the solution employed rather than by the volume of the solution used. Hence it is desirable to employ as high a consistency in the mercerizing treatment as the existing agitation equipment will permit. This practice insures a more efficient re-use and recovery of the caustic reagent, thereby achieving a more economical production of the mercerized cellulose. It is important to carry out the treatment under conditions in which air is excluded as completely as the available apparatus will permit in order to avoid the undesirable oxidation of the cellulose.

After the mercerization of the cellulose has been completed, the caustic solution is removed in a carefully controlled manner to maintain undiminished the high degree of reactivity imparted to the individual fibers by the treatment. The time consumed in washing the caustic soda reagent from the cellulose should be the shortest time that the available equipment will permit, preferably 15 minutes or less.

It is believed that the adverse effect obtained by long time washing may be at least in part due to the attack of the cellulose by oxygen, especially in the more dilute caustic concentrations. Likewise, it is also believed that it may be due in part to the difference in the cellulose swelling phenomena resulting from protracted time of washing in contrast to that occurring when the removal of caustic solution is effected in short time. Whatever may be the explanation, the washing is preferably carried out in as short time as possible.

Where the very highest purity of the cellulosic product is desired, such as will yield, upon conversion into acetate, acetic acid or acetone solutions of acetate of exceptionally low color and haze and sparkling clarity, it may be desirable to repeat the mercerizing step using the same precautions and care in washing the strong alkali from the mercerized cellulose as described above.

In order more particularly to describe the present invention, there follows the description of a typical embodiment of the invention. It will be understood that the various features set forth in connection with this embodiment are by way of illustration only and may be considerably varied within the scope of the present invention.

Completely defibered bleached sulfite wood pulp derived from spruce wood is used, having the following analysis:

Alpha cellulose_____percent__ 95.3
Soda solubles_____do____ 4.1
Viscosity_____(ctps.)__ 16.8

The pulp is dewatered to about 72% moisture content and added to a sufficient amount of 14.9% sodium hydroxide solution at 25° to 30° C. to give a pulp consistency in the slurry of 3% and a caustic concentration of the order of 13.5%. The mass is then agitated until the pulp is completely defibered and a uniform slurry is attained. If equipment provided with proper agitation is employed, this can be accomplished in 30 to 45 minutes. The treatment is preferably carried out under conditions in which there is a minimum contact of pulp with oxygen.

At the end of the treatment the pulp is filtered in order to remove as much of the strong caustic as possible for recovery purposes. It is usually feasible to remove 60% or more of the liquor undiluted without deleterious effects on the cellulose. The cellulose is then washed free of caustic in as short time as possible under conditions in which the cellulose has a minimum contact with oxygen. With suitable apparatus the washing operation can be accomplished in ½ to 1 hour or less. The washed material is maintained saturated with purified water.

The mercerized cellulose will have the following analysis:

Alpha cellulose_____percent__ 98.6
Soda cellulose_____do____ 3.2
Viscosity_____(ctps.)__ 17.7

It may be readily acetylated to give an acetic acid solution of triacetate having less than 200 parts per million color and haze, and in most cases less than 100 parts per million.

Where it is desired to attain the highest clarity of cellulose acetate solutions, the cellulose is classified to remove any cell wall debris, parenchyma cells, fragments of fibers, or other residual impurities. This may be accomplished by any suitable mechanical means. A satisfactory apparatus for the purpose is described in the copending application of Fredrich Olsen, S. N. 39,113, filed September 4, 1935. Since such impurities, usually referred to as "fines," impart an undesirable color or haze or both to the acetic acid and acetone solutions, their removal from the cellulose improves the character of such solutions and is an especially desirable practice in the preparation of material for film and other purposes where the highest clarity is essential.

The washed, mercerized cellulose may, if desired, be given a second mercerization under controlled conditions as set forth above in order to still further reduce the amount of color and haze producing material which may have survived previous processing of the cellulose. The result of giving the cellulose a double mercerization is to provide a product which, upon acetylation, will yield an acetic acid or acetone solution of the acetate having a color and haze of less than 50 parts per million.

To attain a color and haze of the order of 50 parts per million or less in solutions of the triacetate derived from the purified wood cellulose, it is not always necessary to give the product a double mercerization. The residual impurities largely responsible for the color and haze in the solutions of the acetate appear to vary between the species of wood from which the purified cellulose is derived. In some wood species these substances apparently yield more readily to treatment than in other wood species. A single, properly controlled mercerization, as described in the foregoing text, is frequently capable of conditioning the cellulose from such species to yield an acetate solution having a color and haze of the order of 50 parts per million, and frequently as low as 20 to 30 parts per million.

In the practices of the process of this invention, the properties of the cellulose are especially affected by the procedure followed in removing alkali from the cellulose at the completion of the mercerizing treatment. The equipment used for washing the alkali solution from the cellulose should be designed to effect the removal in the shortest time possible.

There is a distinct advantage in the use of concentrations of caustic soda in the range of about 14%. The action of such solutions is to effect the maximum swelling or opening up of the fibers. Thus, increased or optimum reactivity is imparted to the cellulose. Concentrations of the caustic solutions appreciably lower than the order of 13% or higher than the order of 15% result in a lower alpha cellulose content, increased soda solubility, and decreased reactivity of the cellulose toward acetylating reagents.

The most favorable temperature range for carrying out the mercerization is from 25° to 30° C.

These conditions result in the highest alpha and lowest soda soluble content and an optimum reactivity toward esterifying reagents. Temperatures appreciably in excess of 30° C. cause a lower alpha cellulose content, higher soda solubility and reduce the viscosity and yield. Temperatures appreciably lower than 25° C. result in a reduced reactivity of the cellulose which is reflected in higher color and haze of the solutions of the subsequently formed acetate.

Wood cellulose products of the prior practices do not respond satisfactorily to the acetylation reaction. It is believed that this is due, at least in part, to an insufficient accessibility of all parts of the fibers comprising the cellulose to the acetylating reagents. It is conceived that a contributing factor is the lack of uniformity of treatment to which the wood and resulting pulp are generally subjected. It may be stated that, in general, the effect of conventional methods is to remove impurities from the pulp in such a manner as to leave the residual impurities distributed in a quite variable manner. Thus, while the total amount of residual impurities may be reduced to a low, but nevertheless insufficient amount, the individual fibers will vary sharply with respect to the extent to which the pores, interstices, and capillaries have been cleared of impurities. Therefore some fibers comprising the mass of cellulose may be partly or even completely accessible to the subsequently added acetylation reagents while others will still contain amounts of impurities which effectually obstruct the passage of the acetylating reagent to the interior portions. Such fibers are insufficiently permeable and lacking in reactivity.

The result of this condition is to restrain the attack of the acetylating reagents and confine their action to only those portions of fibers which have been cleared of impurities. The percentage of such inaccessible cellulosic material may be so large that the mass of cellulose as a whole is rendered completely unacetylatible. In any event, the percentage of unacetylated fibers and particles resulting from the application of acetlyating reagents to such improperly purified wood pulps is so great that the product is unfit for commercial use.

In contrast to the foregoing, the mercerized fibers resulting from the process of the present invention have a swollen, skeletal structure comprising a network of capillary passages readily permeable to treating reagents. Any residual impurities which remain associated with the cellulose are uniformly distributed and/or so modified that they cease to cause any substantial restraint to the permeability of the fiber. The process provides the conditions of temperature, time, concentration of reagent, and method of washing the treating solution from the cellulose which impart a highly favorable physical and chemical condition of the fibers for acetylation, and at the same time is economical in the use of reagent.

The mercerized cellulose product of the present invention is preferably maintained in a water-wet condition and converted into acetate without drying by the customary evaporative methods by dehydrating with a water miscible liquid as described in the copending application of Sheldon et al., S. N. 70,372, filed March 23, 1936. By means of the dehydration of the mercerized cellulose by displacement with acetic acid therein described, the highly swollen, porous, reactive condition of the fibers is preserved up to the very time at which the acetylation reaction is initiated. Furthermore, if the viscosity of the mercerized cellulose product of the present invention is not less than 15 centipoises, it may be even dried by the conventional evaporative methods and thereafter acetylated according to known methods, but preferably by the practice described in the copending application of Lyle Sheldon et al., S. N. 81,844, filed May 26, 1936.

In many cases the wood celluloses of the prior practices may be improved with respect to their permeability and reactivity by subjecting them to the controlled mercerizing treatment of the present invention. Such treatment operates to impart a maximum degree of swelling and porosity to the fibers thus greatly increasing the accessibility of the cellulose to subsequently added treating reagents. Furthermore, such material may in many cases be readily converted into a superior quality of cellulose acetate by the simple, rapid, and economical process described in the before mentioned copending application, S. N. 70,372.

In addition to the enhancement of the permeability and reactivity of purified cellulose by the application of the purification step of the present invention, such fibers are materially improved with respect to the reduction of color and haze producing bodies. As a consequence, when applied to cellulose which has an alpha cellulose content of at least 94% and a soda soluble content of not exceeding 5%, the general effect is to render such cellulose fibers capable of acetylation to a completely satisfactory quality of acetate.

In the foregoing specification and following claims, terms have been used having the following meanings:

*Porosity*, as used herein, is defined as the absorptive power of a substance, particularly the fibers with which the present invention is concerned. By fibers of high porosity, as used in this specification, is meant a swollen skeletal fiber structure comprising a network of capillary channels substantially cleared of amorphous and other non-cellulosic material. The network of capillary vessels of such swollen fibers serves to distribute liquid throughout the cell walls of every fiber. Such liquids provide a diffusion medium by means of which the desired reagents are able promptly to reach every part of the fiber. These liquids may be the actual treating solutions themselves. In addition to the network of channels mentioned above, the cell wall substance should be in a substantially completely swollen condition in order to assist, by diffusion through the swollen cell walls, the work of the capillaries in the distribution of liquid uniformly throughout the fiber. Fibers are considered to be less porous or permeable when the amorphous and other non-cellulosic material has been insufficiently removed to provide a network of substantially unobstructed capillary passages, or the fiber structure is insufficiently swollen, or both. Porous fibers will absorb more liquid than impermeable or non-porous fibers.

*Reactivity*, as used herein, is that property as defined at pages 15, 16 and 17 of the application of Herzog, Schneider and Goff, filed November 23, 1936, Serial No. 112,305.

*Alpha cellulose* is defined as that portion of a sample of cellulosic material not dissolved by 17.5% sodium hydroxide solution at 20° C., determined by a refinement of the method described by H. F. Lewis in "Technical Association Papers", series XVII, #1, 436 (1934).

*Soda soluble material* is defined as that portion of a cellulosic sample dissolved when it is subjected to the action of 7.14% sodium hydroxide solution at the boiling point of water for 3 hours by a refinement of the method of Griffin, "Technical Methods of Analysis", 492 (1927 ed.).

*Bleachability of cellulose,* as used herein, is a measure of the materials oxidizable by potassium permanganate in the presence of an acid under specific conditions as described below, and is expressed in terms of standard bleaching powder containing 35% available chlorine. The determination consists of treating a 1 gram sample of material completely dispersed in 750 cc. of a solution composed of 0.133 N sulfuric acid and N/300 potassium permanganate for 5 minutes at 25° C.; reacting the unconsumed potassium permanganate with potassium iodide, and back titrating with sodium thiosulfate. A detailed description of the method, including the conversion table for expressing the permanganate number in terms of per cent bleaching powder of 35% available chlorine, was published by T. A. P. P. I., series XVII, #1, 146 (1934), "Permanganate Number of Pulp" by R. N. Wiles.

*Color and haze.*—The measurements referred to herein of the color and haze of the acetic acid and acetone solutions of the acetate were made by comparisons with standards of known color and turbidity expressed in parts per million. The standards are those used for water analysis recommended by the American Public Health Association and consist of platinum cobalt (for color determinations) and fuller's earth (for turbidity comparisons). With the materials recommended by the American Public Health Association, a series of standard solutions ranging from 10 p. p. m. to 200 p. p. m. inclusive at intervals of 10 p. p. m. were prepared for both color and haze. 100 cc. of each of these solutions was hermetically sealed in an 8-ounce, wide-mouth, glass-stoppered bottle having an internal diameter of $2\frac{1}{16}$ inches. The acetate dope samples to be measured were prepared in bottles identical with those employed in making the color and haze standards and compared under a controlled source of light, first with the color standards until the particular solution of each which most nearly corresponded to the dope under comparison was found, and then with the haze standards in conjunction with the most appropriate color standard. The measurements of the color and turbidity of the acetate dope are made exactly 1 hour after the dope has been killed by the addition of the dilute acetic acid. At the time of measurement, the dope must be absolutely free from air bubbles and at a temperature of 25° C., and the quantity of dope under comparison in the bottle must not be less than 100 cc. It has been found that color and haze ratings by this method can be made to an accuracy of approximately 10 p. p. m.

As many changes could be made in carrying out the above compositions and processes without departing from the scope of the invention, it is intended that all matter contained in the above description shall be interpreted as illustrative and not in a limiting sense.

We claim:

1. In the treatment of wood for the production of cellulose derivatives the process comprising providing a bleached and purified wood cellulose having a soda soluble content of about 4% or less determined as that portion dissolved by boiling in 7.14% sodium hydroxide for three hours and an alpha cellulose content of 95% or over, subjecting said pulp to the action of a caustic soda solution of a concentration corresponding to about 13–15% at a temperature of the order of 25–30° C. for a time sufficient to dissolve the soluble non-alpha cellulose constituents and increase the alpha cellulose content to substantially 98% or over and reduce the soda soluble content and render the fibers highly swollen and porous, and then washing said pulp at a rate sufficiently rapid to remove the more dilute caustic concentrations below 7% in less than thirty minutes so as to maintain the highly swollen and porous condition of the fibers in the washed pulp.

2. In the treatment of wood for the production of cellulose derivatives a process as set forth in claim 1 in which the caustic soda treatment and washing are repeated after the first washing so that the pulp is further purified and the resulting derivatives therefrom are clarified.

LYLE MELVIN SHELDON.
LIONEL ELMER GOFF.